United States Patent [19]
Hirotsu et al.

[11] Patent Number: 6,146,761
[45] Date of Patent: Nov. 14, 2000

[54] FUNCTIONAL PARTICLE-DISPERSED THIN FILM, GRANULAR MAGNETIC THIN FILM AND PRODUCTION PROCESSES THEREOF

[75] Inventors: Yoshihiko Hirotsu; Bo Bian, both of Osaka-fu; Akihiro Makino, Niigata-ken, all of Japan

[73] Assignee: Alps Electric Co., Ltd., Tokyo, Japan

[21] Appl. No.: 09/154,552

[22] Filed: Sep. 16, 1998

[30] Foreign Application Priority Data

Sep. 16, 1997 [JP] Japan .................................. 9-251184

[51] Int. Cl.⁷ ........................................................ G11B 5/66
[52] U.S. Cl. .................. 428/402; 428/403; 428/692; 428/684 T; 428/684 TS; 428/900; 427/128; 427/129; 427/130
[58] Field of Search .................... 428/684 T, 684 TS, 428/402, 403, 900, 692; 427/128–130

[56] References Cited

U.S. PATENT DOCUMENTS

| | | | |
|---|---|---|---|
| 5,789,088 | 8/1998 | Nakai | 428/611 |
| 5,843,569 | 12/1998 | Kaitsu | 428/323 |
| 5,878,798 | 3/1999 | Kobayashi | 428/332 |
| 5,908,711 | 6/1999 | Tachibana | 428/694 T |
| 5,988,674 | 11/1999 | Marinero | 428/653 |

FOREIGN PATENT DOCUMENTS

| | | |
|---|---|---|
| 54-147009 | 11/1979 | Japan . |
| 9063036A | 3/1997 | Japan . |

*Primary Examiner*—Leszek Kiliman
*Attorney, Agent, or Firm*—Brinks Hofer Gilson & Lione

[57] ABSTRACT

A functional particle-dispersed thin film and a granular magnetic thin film are described with production processes thereof. The thin film is composed of plural seed crystal particles each dispersedly formed on a matrix or primary coat each having crystalline orientation by growing epitaxially to the matrix or primary coat so as to align its crystal orientation with that of the matrix or primary coat, and functional particles each formed around the plural seed crystal particles by growing epitaxially to and surrounding each of the plural seed crystal particles.

28 Claims, 9 Drawing Sheets

FUNCTIONAL PARTICLE-DISPERSED THIN FILM, GRANULAR MAGNETIC THIN FILM AND PRODUCTION PROCESSES THEREOF

BACKGROUND OF THE INVENTION

1. Field of the Invention

The present invention relates to a particle-dispersed thin film composed of particles having an improved crystalline orientation and dispersedly formed on a matrix, to a granular magnetic thin film using the same, and to production processes of these thin films.

2. Description of the Related Art

Studies on granular ferromagnetic thin films each comprising fine ferromagnetic particles of nanometer order dispersed on a nonmagnetic matrix have been reported. In recent studies, thin films each composed of fine crystalline particles of cobalt formed on a carbon matrix have been reported as probable and hopeful candidates as materials for ultrahigh density magnetic recording media.

In addition, as a material providing tunneling giant magnetoresistance effect (magnetoresistive effect), a granular thin film of a Co—Al—O system alloy based upon cobalt formed by sputtering is known to have a high resistance and excellent soft magnetic properties.

These materials having magnetoresistance effect are generally formed by dispersing ferromagnetic particles in a nonmagnetic electric conductive matrix, and provide change of the electric resistance in accordance with a variation of an external magnetic field. The materials are believed to have magnetoresistance effect depending on the spin of conductive electrons in an interface between the matrix and dispersed particles, and an improved magnetoresistance ratio is believed to be obtained by increasing dispersed particles in number while maintaining the dispersed particles fine in size. Accordingly, demands have been made to develop techniques to disperse fine ferromagnetic particles in a nonmagnetic electric conductive matrix.

As an example of a production process of such a particle-dispersed magnetoresistive substance, there is known a process of forming, on a substrate, an alloy film composed of a nonmagnetic electric conductive element and a ferromagnetic element having an extremely small mutual solubility to the nonmagnetic electric conductive element, heating the film after film-formation so as to dispersedly separate ferromagnetic particles. A process of forming discontinuous ferromagnetic particles onto a substrate by sputtering, and adhering a nonmagnetic thin film on the substrate and particles is also known.

The aforementioned process, however, cannot be applied when the nonmagnetic electric conductive element has any mutual solubility to the ferromagnetic material. Further, even if fine particles of nanometer order could be separated in a matrix, when the element composing the matrix and the element composing the particles have a little mutual solubility to each other, a part of the particles are absorbed by the matrix so as to fail to enhance the particle concentration. In addition, when the quantity of ferromagnetic material is increased simply to complement decrease of the particle concentration, a ferromagnetic material phase can frequently form giant particles or a continuous phase. Therefore, dispersed fine particles in a high concentration cannot be obtained.

In the production of the aforementioned particle-dispersed magnetoresistive material, if the crystalline orientation of each of the dispersed ferromagnetic particles can be controlled to a fixed direction, there is possibilities of imparting magnetic anisotropy and of giving a thin film having an satisfactory magnetoresistance effect. Under the present circumstances as mentioned above that fine ferromagnetic particles cannot be dispersed in a high density, however, the crystalline orientation of each of the particles cannot nearly be controlled.

SUMMARY OF THE INVENTION

The present invention has been accomplished under these circumstances. Accordingly, it is an object of the present invention to provide a technique to form fine particles of nanometer order dispersedly on a substrate or on a primary coat while controlling their crystalline orientation.

It is another object of the present invention to provide a technique to disperse fine ferromagnetic particles of nanometer order each having a controlled crystalline orientation on a substrate, and a technique to control dispersion of these particles.

A yet further object of the present invention is to provide a technique of epitaxially forming films of ferromagnetic particles with the intervention of seed crystal particles on a substrate or a primary coat, even when such a film cannot be directly formed on the substrate or primary coat with satisfactory crystalline orientation.

To achieve the aforementioned objects, the present invention provides, in a first embodiment, a functional particle-dispersed thin film composed of, plural seed crystal particles each dispersedly formed on a matrix or primary coat having a satisfactory crystalline orientation by epitaxially growing to the matrix or primary coat so as to align its crystal orientation with that of the matrix or primary coat, and functional particles each formed around the plural seed crystal particles, by epitaxially growing to cover each of the plural seed crystal particles.

This functional particle-dispersed thin film may further comprise a segregating layer formed around the functional particles so as to segregate and cover the functional particles.

In the first embodiment of the invention, the functional particle-dispersed thin film may be one in which the seed crystal particles are composed of any of elements capable of epitaxially growing to the constitutive atoms of the matrix or primary coat; the functional particles are composed of any of elements capable of epitaxially growing to the seed crystal particles; and the functional particles are epitaxially grown to the seed crystal particles so as to align the crystalline orientation of the functional particles with that of the seed crystal particles.

The matrix or primary coat in the first embodiment of the invention may preferably be composed of one selected from the group consisting of Si, Ge, GaAs, MgO, NaCl, KCl, $Al_2O_3$, sapphire and quartz.

In the first embodiment, the seed crystal particles may preferably be composed of one or more elements selected from the group consisting Au, Ni, Ag, Si, Cu, Pd, Pt and Ge.

The functional particles in the first embodiment may advantageously be composed of one or more elements selected from the group consisting of Fe, Co, Ni and rare earth elements.

In a second embodiment to achieve the above objects, the present invention provides a granular magnetic thin film composed of plural seed crystal particles each dispersedly formed on a matrix or primary coat each having a satisfactory crystalline orientation by epitaxially growing relative to the matrix or primary coat so as to align its crystal orientation with that of the matrix or primary coat; ferromagnetic particles each formed around the plural seed crystal particles by epitaxially growing relative to each of the plural seed crystal particles to surround the same, and a segregating layer formed surrounding the ferromagnetic particles so as to segregate and cover each of the ferromagnetic particles.

In second embodiment of the invention, it is advantageous that the seed crystal particles are composed of any of elements capable of epitaxially growing to the constitutive atoms of the matrix or primary coat, the ferromagnetic particles are composed of any of elements capable of epitaxially growing to the seed crystal particles, and the ferromagnetic particles are epitaxially grown to the seed crystal particles so as to align the crystalline orientation with each other.

The ferromagnetic particles in the second embodiment may preferably be formed larger than the seed crystal particles.

It is advantageous that the ferromagnetic particles in the second embodiment of the invention is formed equal to or less than 1,000 angstroms (100 nm) in size.

The matrix or primary coat in the second embodiment of the invention may preferably be composed of one substance selected from the group consisting of Si, Ge, GaAs, MgO, NaCl, KCl, $Al_2O_3$, sapphire and quartz.

In the second embodiment, the seed crystal particles may preferably be composed of one or more elements selected from the group consisting Au, Ni, Ag, Si, Cu, Pd, Pt and Ge.

The ferromagnetic particles in the second embodiment may advantageously be composed of one or more elements selected from the group consisting of Fe, Co, Ni and rare earth elements.

The segregating layer in the second embodiment may advantageously be composed of an amorphous non-conductive insulator.

In the second embodiment of the invention, the particle size of each of the seed crystals may preferably be equal to or less than 200 angstroms (20 nm).

The interval or distance between each of the plural ferromagnetic particles in the second embodiment may preferably be equal to or less than 50 angstroms (5 nm).

In the second embodiment of the invention, the easy axis of each of the dispersed ferromagnetic particles is advantageously aligned in one direction.

The present invention further provides, in a third embodiment to achieve the objects, a process of producing a functional particle-dispersed thin film comprising the steps of: epitaxially growing and dispersedly forming plural seed crystal particles onto a matrix or primary coat each having a satisfactory crystalline orientation; epitaxially growing constitutive atoms of functional particles onto the surfaces of these seed crystal particles so as to form the functional particles dispersedly surrounding each of the seed crystal particles, and forming a segregating layer to surround each of the functional particles.

In addition and advantageously, the present invention provides, in a forth embodiment, a process of producing a granular magnetic thin film comprising the steps of: epitaxially growing and dispersedly forming plural seed crystal particles onto a substrate or primary coat having a satisfactory crystalline orientation; epitaxially growing constitutive atoms of ferromagnetic particles onto the surfaces of these seed crystal particles so as to form the ferromagnetic particles dispersedly surrounding each of the seed crystal particles, and forming a segregating layer to surround each of the ferromagnetic particles.

In the forth embodiment of the invention, the interval between each of the seed crystal particles can be controlled by regulating the substrate temperature in the formation of the seed crystal particles.

The ferromagnetic particles or functional particles in the third and forth embodiments can be epitaxially grown in a magnetic field to surround the seed crystal particles.

BRIEF DESCRIPTION OF THE DRAWINGS

FIG. 7 is an electron micrograph illustrating dispersion of Au–Fe composite particles of Sample 3a.

DESCRIPTION OF THE PREFERRED EMBODIMENT

The embodiments of the present invention will now be described in detail with reference to the drawings, but these embodiments should never be construed to limit the scope of the invention.

Figure 1:
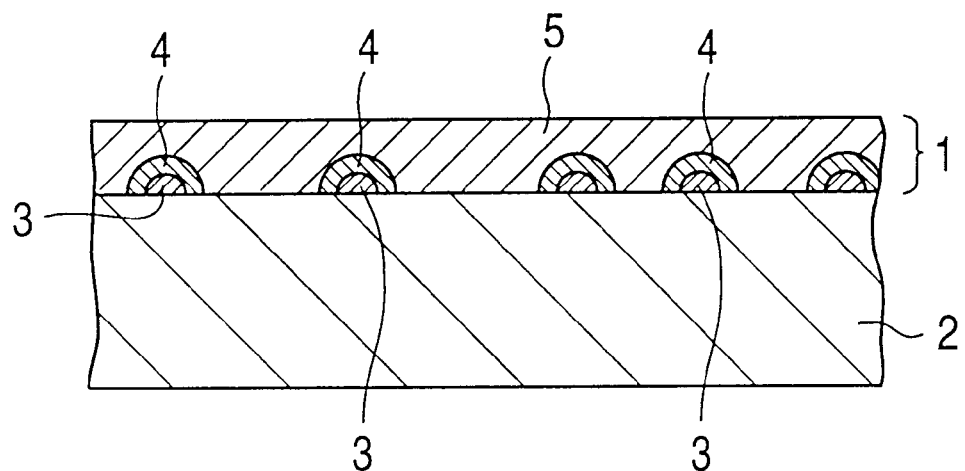
FIG. 1 is a sectional view illustrating an embodiment of a functional particle-dispersed thin film.

FIG. 1 is a diagram illustrating an embodiment composed of a matrix (substrate) 2 and a granular magnetic thin film (functional particle-dispersed thin film) 1, according to the invention, formed on the matrix. The granular magnetic thin film 1 in this embodiment is composed of a multiplicity of seed crystal particles dispersedly formed on the matrix 2, a-multiplicity of ferromagnetic particles (functional particles) 4 formed around the seed crystal particles 3 to cover each of the seed crystal particles 3, and a segregating layer 5 covering the multiplicity of the ferromagnetic particles 4.

Figure 2:
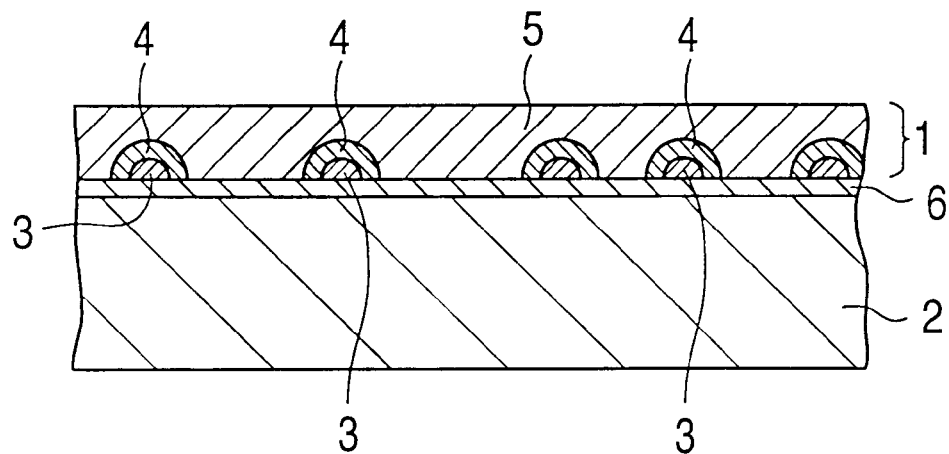
FIG. 2 is a sectional view showing another embodiment of the functional particle-dispersed thin film.

FIG. 2 is a diagram showing another embodiment of the invention which is further composed of a granular magnetic thin film (functional particle-dispersed thin film) 1 according to the invention formed on a primary coat 6 on a matrix (substrate) 2. In this embodiment, the granular magnetic thin film 1 has the same structure with that shown in FIG. 1.

In the structures shown in FIGS. 1 and 2, the matrix 2 or the primary coat 6 is composed of one substrate selected from Si, Ge, GaAs, MgO, NaCl, KCl, $Al_2O_3$, amorphous $Al_2O_3$ (a-$Al_2O_3$), sapphire and quartz.

The seed crystal particles 3 are composed of one or more elements selected from the group consisting of Au, Ni, Ag, Si, Cu, Pd, Pt and Ge.

The constitutive element of the seed crystal particles 3 used herein is selected from those which can epitaxially grow relative to the matrix 2 or the primary coat 6.

The ferromagnetic particles 4 is composed of one or more elements selected from Fe, Co, Ni and rare earth elements. The aforementioned rare earth elements are one or more elements selected from Nd, Sm, Eu, Gd, Tb, Dy, Ho, Er, Tm, Yb and Lu.

As the matrix 2 or the primary coat 6 in the structures illustrated in FIGS. 1 and 2, one having a satisfactory crystalline orientation is employed. To be more specific, a single crystal substrate having a grain boundary inclination of the crystal equal to or less than about 5 degrees, or a primary coat having an arranged crystalline orientation to such an extent as the single crystal substrate. The matrix 2 is formed into a substrate or board in this embodiment, but the form of the matrix 2 is not limited to such a board and includes the forms of a film, a tape, a line and others.

The seed crystal particles 3 are composed of an aggregate of crystals epitaxially grown to the crystals of the matrix 2 or the primary coat 6. The constitutive crystals of the seed crystal particles 3 are oriented in accordance with the crystalline orientation of the matrix 2 or the primary coat 6. Further, the ferromagnetic particles 4 are grown epitaxially to the seed crystal particles 3, and the constitutive crystals of the ferromagnetic particles 4 are oriented in accordance with the crystalline orientation of the seed crystal particles 3. Accordingly, the crystal of each of the ferromagnetic particle 4 formed on the matrix 2 or primary coat 6 is oriented in accordance with the crystalline orientation of the matrix 2 or the primary coat 6.

The aforementioned segregating layer 5 can be selected from suitable substances according to required characteristics. In this embodiment, for example, a nonmagnetic insulator having a high resistance such as $Al_2O_3$ or $SiO_2$ is employed.

In order to form a soft magnetic material or to obtain a high giant magnetoresistance, the segregating layer 5 can have a relatively high resistance and some magnetism, and may be $Al_2O_3$ doped with Fe or Co, or FeO, $Fe_3O_4$ or the like.

The structure shown in FIG. 1 or FIG. 2 can be obtained by the following manner: First, the seed crystal particles 3 are formed on a matrix 2 composed of a single crystal or a primary coat 6 having a satisfactory crystalline orientation by a film-forming means such as electron beam deposition or sputtering. The temperature of the matrix 2 preferably falls in the range from 200 to 500° C., and the pressure inside a film-forming chamber should be reduced.

The seed crystal particles 3 are preferably formed at a deposition rate of about 0.05 to 0.3 nm/min. This deposition rate is slower in one order or more than film-forming rates usually employed; and deposition of atoms at such a slow deposition rate provides epitaxial growth of formed particles and hence gives not a film but dispersed particles.

To be more specific, a (100) texture NaCl substrate can be employed as the matrix 2. Onto this substrate are dispersedly formed, by a film-forming method, the seed crystal particles 3 of Au each having a lower surface energy than that of NaCl constituting the substrate. Since Au has a lower surface energy than that of NaCl, the interval between each of the seed crystal particles can be regulated by thermoregulation of the matrix 2 or regulating the film-forming rate of seed crystal particles.

Next, Fe is vapor-deposited onto the seed crystal particles 3 by a film-forming process such as electron beam deposition so as to form the ferromagnetic particles 4 of Fe covering each of the seed crystal particles 3. As the fine particles (particulates) of Fe have satisfactory drape and hence can grow epitaxially to the seed crystal particles 3 of Au, the vapor-deposited atoms deposit and epitaxially grow in accordance with the crystalline orientation of the seed crystal particles 3 so as to be crystallized with orientation. The temperature in the epitaxial growth of the ferromagnetic particles 4 should fall in the range from 200 to 500° C. and preferably from 300 to 400° C. When Fe is employed, the temperature should preferably be around 300° C. The deposition rate should be such that the ferromagnetic particles 3 cover the seed crystal particle but the adjacent ferromagnetic particles 4 do not fuse each other by deposition and growth, and may for example be about 0.3 to 0.6 nm/min.

After completion of the formation of ferromagnetic particles 4 . . . , a segregating layer 5 is formed into a film by a similar film-forming means as mentioned above at a usual deposition rate to cover the ferromagnetic particles 4 . . . , and thereby the granular magnetic thin film 1 having a sectional structure shown in FIG. 1 is obtained. When the constitutive element of the ferromagnetic particles 4 in the structures illustrated in FIGS. 1 and 2 has a poor wettability and hence cannot grow epitaxially to the constitutive element of the matrix 2 or the primary coat 6, it may only have to be one capable of epitaxially growing to the constitutive element of the seed crystal particles 3.

By way of illustration, when Fe particles are formed directly onto a matrix 2 composed of a (100) texture NaCl, Fe particles cannot grow epitaxially to the (100) plane of NaCl in conventional film-forming conditions. On the contrary, Au particles can easily grow epitaxially to the (100) plane of NaCl.

As Fe particles can grow epitaxially to Au particles, the crystalline orientation of the Fe particles can be aligned in accordance with the matrix 2 or primary coat 6, as if Fe particles could epitaxially be grown to the matrix 2. Accordingly, Fe particles with a satisfactory crystalline orientation can be formed onto the matrix 2 or primary coat 6.

Next, when Au particles are formed onto the matrix 2 or primary coat 6, dispersion of the Au particles can easily be regulated by controlling the temperature of the matrix 2 or primary coat 6 and the deposition rate (film-forming rate) of the Au particles. To be more specific, when the temperature of the matrix 2 is raised, the Au particles can be dispersed scatteredly, whereas when the deposition temperature is lowered, the Au particles can be dispersed thickly.

Since the ferromagnetic particles 4 are formed by covering the Au particles with the Fe particles, the interval between each of the multiplicity of ferromagnetic particles 4 . . . can be freely regulated by adjusting concentration of the dispersed Au particles.

This is probably because nucleus sites (e.g., atomic steps on the surface of the matrix) in the formation of Au clusters decrease with an increasing-temperature of the matrix.

The granular magnetic thin film 1 thus prepared comprises a multiplicity of the dispersed ferromagnetic particles 4 each having a size of equal to or less than 1,000 angstroms (100 nm) which are dispersed at intervals, and hence shows ferromagnetism. As the ferromagnetic particles 4 . . . each having aligned crystalline orientation are dispersed at intervals, giant magnetoresistance effect leading to tunnel effect may possibly be obtained by regulating the interval between the particles to such an extent as to provide tunnel effect.

The particle size of the seed crystal particles 3 is preferably equal to or less than 200 angstroms (20 nm), and the interval between the ferromagnetic particles of not more than 50 angstroms (5 nm) can provide tunnel effect.

In the aforementioned embodiment, a granular magnetic thin film 1 is obtained with the use of the ferromagnetic particles 4. As the functional particles in addition to the ferromagnetic particles 4, there may be mentioned dispersed superconductive particles, dispersed semiconductive particles, dispersed electric conductive particles, dispersed thermal conductive particles to be used, for example, as a heat exchange element, and dispersed elastic particles to be used, for instance, as a vibration deadening material. The use of any of such functional particles provides a material or substance having excellent characteristics due to proximity effect of each of the functional particles.

Depending on objects of the use or application, the segregating layer 5 can be omitted and the thin film can be used with functional particles 4 exposed. By way of example, when the thin film is used as a reflector with the matrix 2 and the functional particles 4 each being excellent in reflection properties, the aforementioned structure can give a reflector composed of homogeneously dispersed reflective functional particles 4 each having aligned crystalline orientation as nano-crystal particles.

The present invention will now be described in more detail with reference to the following examples.

EXAMPLE 1

Using an electron beam deposition device, Au particles were dispersedly formed onto a (100) texture NaCl substrate with reducing the inside pressure of a deposition chamber to $3 \times 10^{-7}$ Pa. The deposition was conducted at a temperature of the substrate of 300° C. at a film-forming rate of 0.1 nm/min. The mean film thickness of Au particles was regulated to the range from about 2 to about 5 nm in order to deposit Au particles dispersedly without fusion of each of the Au particles and formation of a film.

After deposition of the Au particles, the substrate was heated to and maintained at 300° C., and Fe was deposited at a film-forming rate of 0.5 nm/min. to grow Fe particles surrounding the Au particles. In order to avoid the formation of a continues film of Fe by growth of the Fe particles, the mean film thickness of the Fe particles was regulated to the range from 2 to 5 nm.

Onto the resultant product, a film of amorphous $Al_2O_3$ (hereinafter briefly referred to as a-$Al_2O_3$) having a thickness of 4 nm was formed to give Samples 1 to 3A each having the structure indicated in Table 1 below. In Table 1, $D_{Au}$ (nm) represents the thickness of the Au particles measured by a film thickness monitor, $D_{Fe}$ (nm) denotes the thickness of the Fe particles measured by the film thickness monitor, and $T_{Au}$ (° C.) indicates the temperature of the matrix in deposition of the Au particles.

TABLE 1

| Sample No. | $D_{Au}$ (nm) | $D_{Fe}$ (nm) | $T_{Au}$ (° C.) |
| --- | --- | --- | --- |
| 1 | 1.4 | 3.0 | 400 |
| 1A | 1.4 | — | 400 |
| 2 | 1.2 | 3.3 | 350 |
| 3 | 0.7 | 4.8 | 300 |
| 3A | 0.7 | — | 300 |

As apparent from the results shown in Table 1, the Au particles, as the seed crystal particles, each having an ultrafine particle thickness ($D_{Au}$) (nano-crystal particle thickness) ranging from 0.7 to 1.4 nm could be formed, and the Fe particles as ferromagnetic particles each having an ultrafine particle thickness ($D_{Fe}$) (nano-crystal particle thickness) ranging from 3.0 to 4.8 nm could be grown epitaxially and obtained in a dispersed form.

Figure 3:
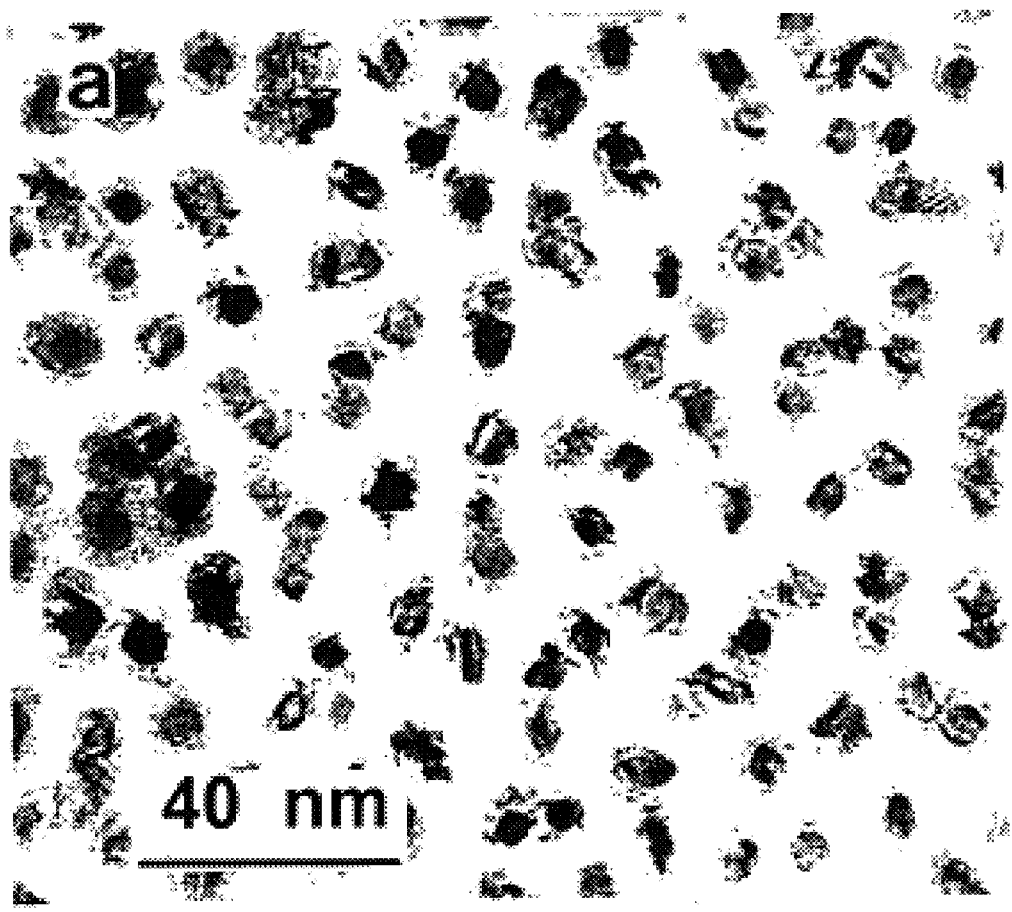
FIG. 3 is an electron micrograph illustrating particle dispersion of Au-Fe composite particles of Sample 1.
Figure 4A:
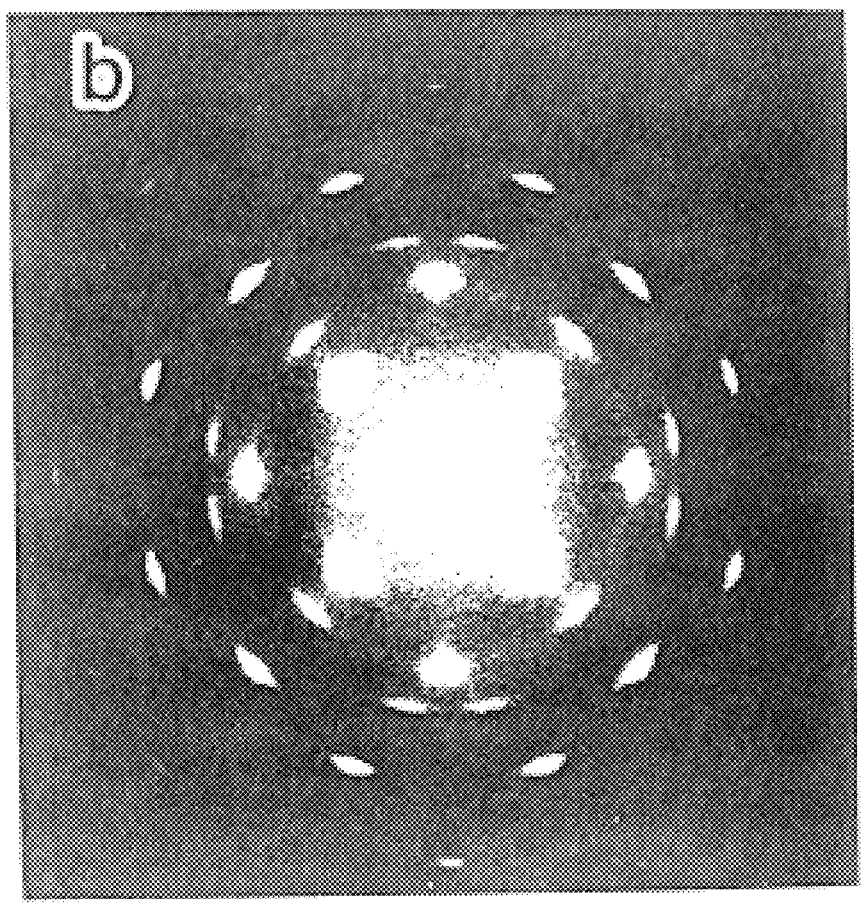
FIG. 4A is a view illustrating a pattern of selected area electron diffraction in Sample 1 shown in FIG. 3.
Figure 4B:
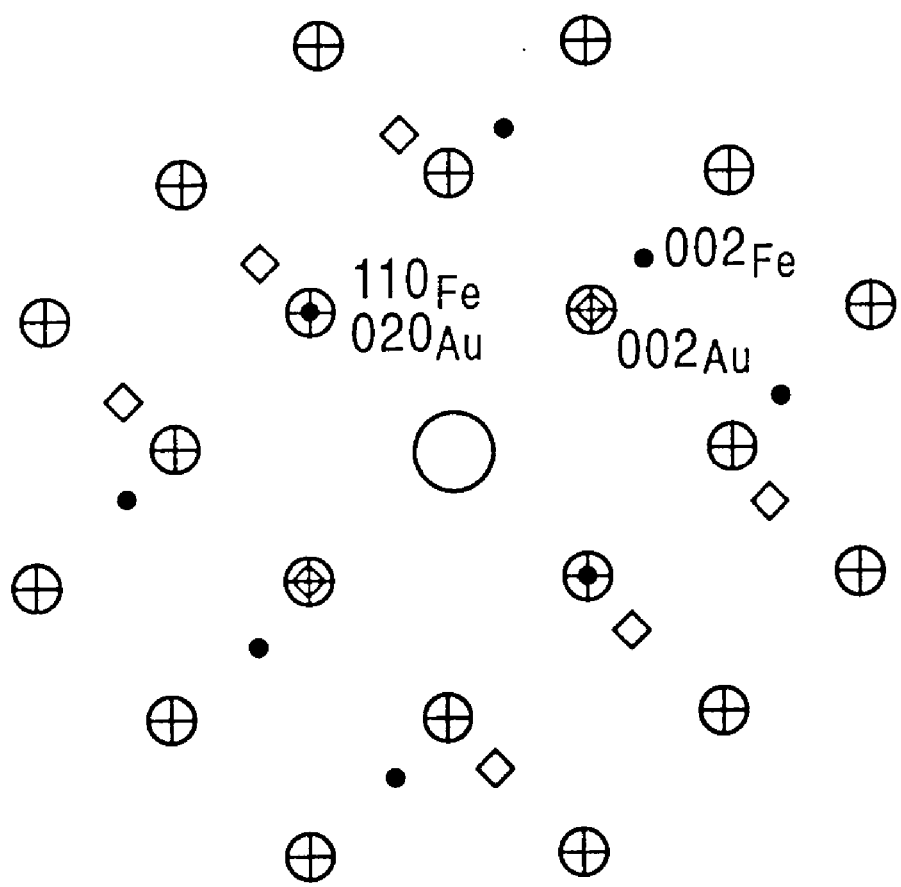
FIG. 4B is an analytic diagram of the aforementioned pattern.

FIG. 3 is an electron micrograph showing dispersion of the Au—Fe composite particles of Sample 1 indicated in Table 1; FIG. 4A is a selected area electron diffraction (SAD) pattern of Sample 1; and FIG. 4B is an analytic diagram of the aforementioned pattern. From analysis of these figures, the particle structure of Sample 1 was found to be a composite particle structure of nano-crystals composed of a Au particle as a core and an Fe particle enveloping the core Au particle.

As shown in the structure of the Au—Fe composite particles in FIG. 3, the Au—Fe composite particles had an average particle size of about 13 nm and an average particle interval of 18 nm, and the Au particles, as the seed crystal particles, each having a particle size (diameter) ranging 3 to 8 nm, and Fe particles, as the ferromagnetic particles, each having particle size (diameter) ranging 10 to 20 nm.

Next, Sample 1A is a sample obtained by forming only Au particles onto a substrate in the same condition as Sample 1. Analysis of electron micrograph was conducted and an SAD pattern was taken on Sample 1A, and it was confirmed that the Au nano-crystal particles are oriented in the <001> direction. In addition, the interval of the Au particles in Sample 1A was equal to the core interval of the composite particles in Sample 1. As apparent from these data, the Au particles were assumed to be in the center of each of the composite particles. From the diffraction spot of Au and α-Fe in FIG. 4B, it was found that the <100> direction of the Au particles and the <100> direction of the α-Fe particles are crystallographically parallel, and that the {010} plane of the Au particles and the {011} plane of the α-Fe particles are parallel to each other. Further, when the composite particle moiety of Au and Fe was analyzed by nano-beam electron diffraction (NBD), whereas diffraction spots of Au and α-Fe were observed, diffraction spots of a Au—Fe alloy phase or an Fe—O mixture were not observed in the analysis area of about 10 nm. Accordingly, it was supposed that the Au particles and Fe particles are not alloyed, and that the Fe particles are dispersedly present surrounding each of the Au particles.

Figure 5A:
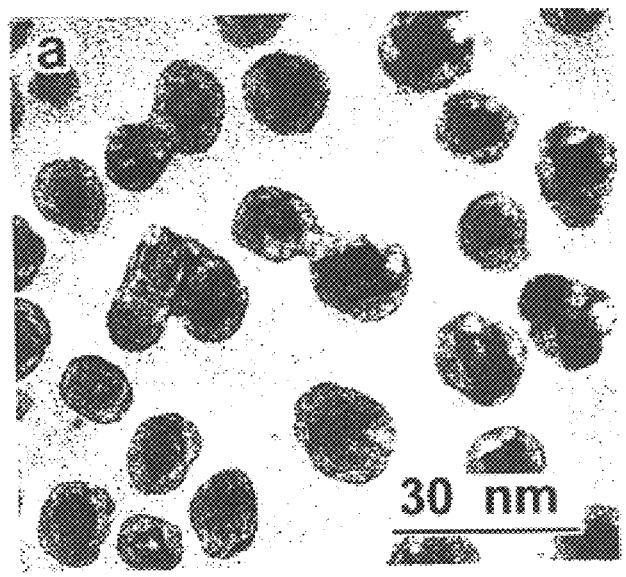
FIG. 5A is an electron micrograph showing dispersion of Au—Fe composite particles of Sample 2.
Figure 5B:
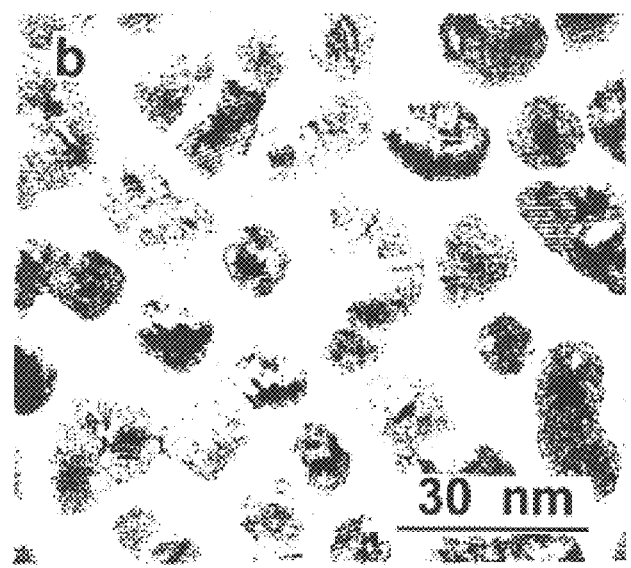
FIG. 5B is an electron micrograph illustrating dispersion of Au—Fe composite particles of Sample 3.

FIGS. 5A and 5B are electron micrographs showing particle dispersion of the Au—Fe composite particles of Samples 2 and 3, respectively, whereas Samples 2 and 3 are samples obtained at different temperatures of the substrates in the formation of the Au particles. The particle sizes of both samples appear to be almost equal to each other, but the interval of the particles of Sample 2, i.e., a sample in which the Au particles were formed at a higher temperature, was larger than that of Sample 3. This indicated that the interval (distance) between each of Au—Fe composite particles can be increased by a higher substrate temperature in the formation of the Au particles. This is probably because a higher substrate temperature decreases the formation rate of nanocrystal cores on the surface of the NaCl substrate.

Next, Samples 3a, 3b and 3c each having the following particle size of the Au particles, substrate temperature in the formation of the Au particles, deposition rate of the Au particles, deposition rate of the Fe particles, particle size of the Fe particles, interval of the Au—Fe composite particles, coercive force (Hc) and $4\pi M_s$ were prepared in the same manner as above. These samples were subjected to the test with the Au—Fe particles coated with amorphous $Al_2O_3$.

TABLE 2

| Sample No. | 3a | 3b | 3c |
|---|---|---|---|
| Au Particle Size (nm) | 4.8 | 2.7 | 2 |
| Ai $T_s$ (° C.) | 300 | 350 | 400 |
| Au Particle Deposition Rate (nm/s) | 0.005 | 0.005 | 0.005 |
| Fe Particle Size (nm) | 13 | 10 | 10 |
| Au—Fe Composite Particle Interval (nm) | 18 | 18 | 27 |
| Coercive force Hc (kA/m) | — | — | 3.07 |
| $4\pi M_s$ (T) | 1.52 | 1.04 | 0.65 |

Figure 6A:
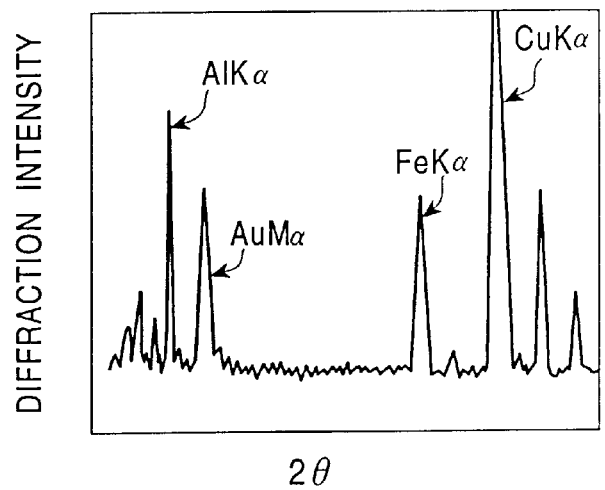
FIG. 6A is a diagram illustrating the results of measurement of Sample 3a by energy dispersive spectroscopy (EDS)
Figure 6B:
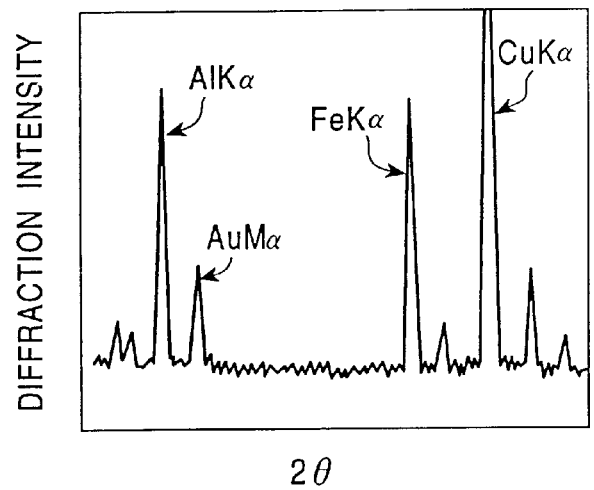
FIG. 6B is a diagram showing the results of measurement of Sample 3b by energy dispersive spectroscopy (EDS)
Figure 6C:
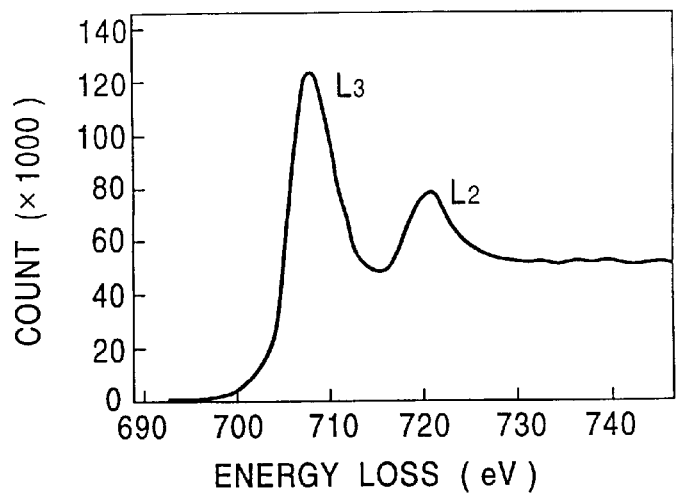
FIG. 6C is a diagram showing the results of measurement of Sample 3c by electron energy loss spectroscopy (EELS).

FIGS. 6A and 6B are diagrams respectively showing the measurement results of Samples 3a and 3b by energy dispersive spectroscopy (EDS), and FIG. 6C is a diagram illustrating the measurement results of Sample 3c by electron energy loss spectroscopy (EELS).

The spectra shown in FIGS. 6A and 6B indicate X rays including Al, Fe, Cu and Au, among which the X ray of Cu is that of micro-lattices used in the measurement of samples by electron microgram.

In FIG. 6C showing a profile of EELS, two peaks, $L_2$ and $L_3$, were observed at an energy loss of about 708 eV, indicating that in the Au—Fe composite particles, the periphery of the Au particles as cores are not composed of a Au—Fe alloy or an Fe oxide but of pure Fe particles. To be more specific, an L-edge of Fe (a spectrum caused by electron excitation of inner shell, L-shell, of Fe) was observed and the white-line ratio (white-line ratio: a ratio of $L_2$, $L_3$ transition spectrum) obtained by this datum was about 3.3, indicating that it is close to a spectrum of pure Fe.

As apparent from these test results, the Fe particles crystallographically oriented relative to the seed crystal particles of Au. Accordingly, it was found that seed crystals of Au can be oriented to a substrate and Fe ferromagnetic particles can be oriented to the seed crystals.

Figure 7:
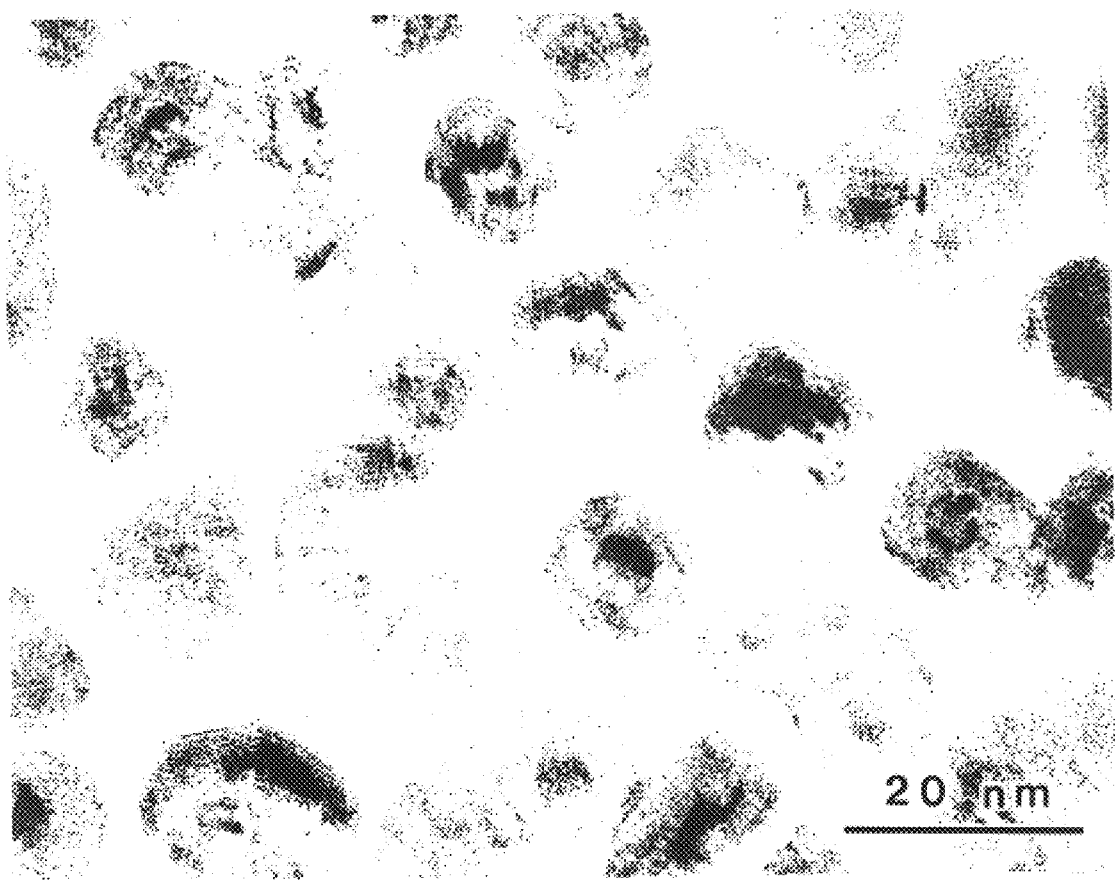
Figure 8:
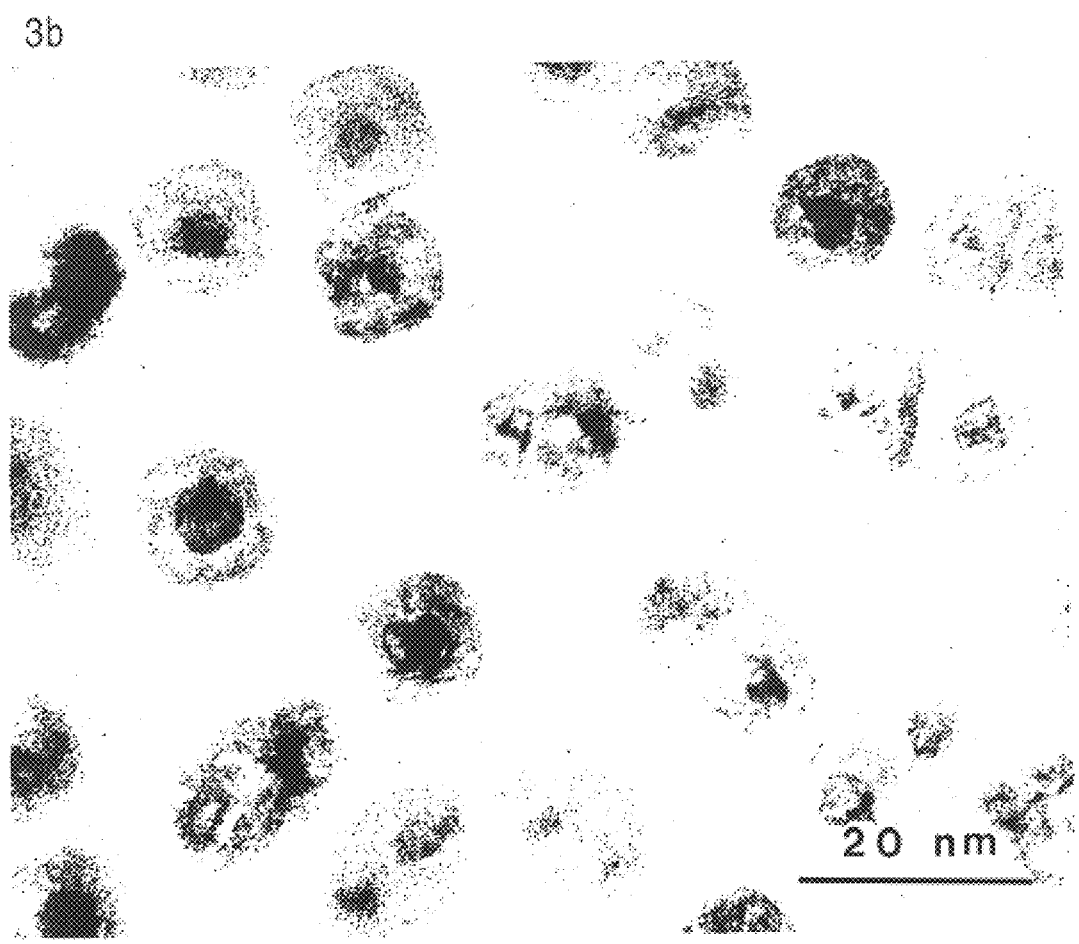
FIG. 8 is an electron micrograph illustrating dispersion of Au–Fe composite particles of Sample 3b.
Figure 9:
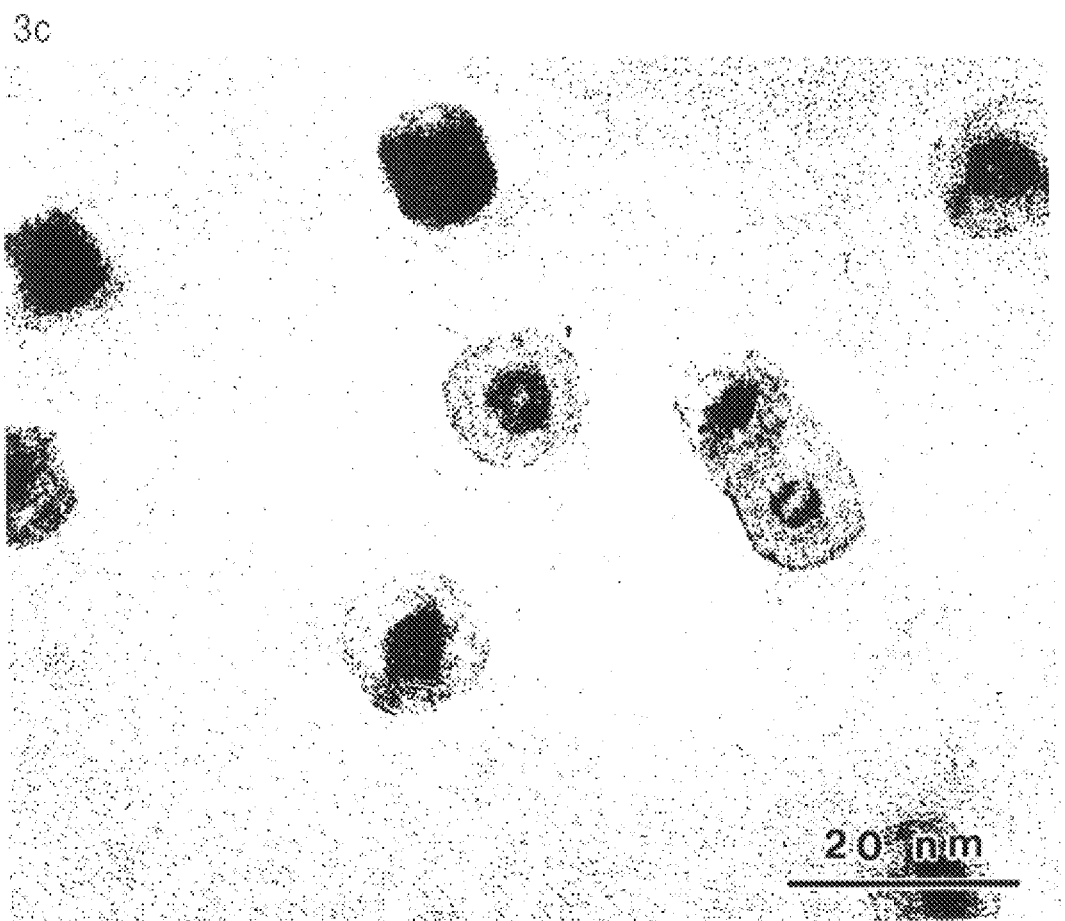
FIG. 9 is an electron micrograph illustrating dispersion of Au-Fe composite particles of Sample 3c.

Next, electron micrographs each illustrating particle dispersion of Sample 3a, Sample 3b and Sample 3c are shown in FIGS. 7, 8 and 9 respectively.

As shown in FIGS. 7 to 9, it was observed that the Au—Fe composite particles are dispersed and that in each of the Au—Fe composite particles, a Au particle constitutes a core and an Fe particle covers or envelops the Au particle.

As apparent from FIGS. 7 to 9, densities of dispersion of the Au—Fe composite particles were highest in sample 3a in FIG. 7, medium in Sample 3b in FIG. 8 and lowest in Sample 3c in FIG. 9. This is probably because the substrate temperatures in the formation of the Au particles were lowest (300° C.) in Sample 3a, moderate (350° C.) in Sample 3b and highest (400° C.) in Sample 3c. It was also found from the comparison among the results shown in FIGS. 7, 8 and 9 that the density or concentration of dispersion of Au—Fe composite particles can be regulated by controlling the substrate temperature in the formation of the Au particles.

Other embodiments and variation will be obvious to those skilled in this art, this invention is not to be limited except as set forth in the following claims.

What is claimed is:

1. A functional particle-dispersed thin film comprising:
   a plurality of seed crystal particles having a seed crystalline orientation and dispersedly formed on a layer having a predetermined crystalline orientation and selected from one of the group consisting of a matrix and a primary coat, the seed crystal particles grown epitaxially such that the seed crystalline orientation is aligned with the predetermined crystalline orientation of the layer, and
   functional particles formed around the seed crystal particles by epitaxial growth and surrounding each of the seed crystal particles.

2. The functional particle-dispersed thin film as claimed in claim 1, wherein said thin film further comprises a segregating layer formed around the functional particles to segregate and cover the functional particles.

3. The functional particle-dispersed thin film as claimed in claim 1, wherein
   said seed crystal particles are composed of an element capable of epitaxial growth on the layer;
   said functional particles are composed of an element capable of epitaxial growth on the seed crystal particles; and
   the functional particles are grown epitaxially on the seed crystal particles such that a crystalline orientation of the functional particles is aligned with the seed crystalline orientation.

4. The functional particle-dispersed thin film as claimed in claim 2, wherein said seed crystal particles are composed of an element capable of epitaxial growth on the layer;
   said functional particles are composed of an element capable of epitaxial growth on the seed crystal particles; and
   the functional particles are epitaxially grown on the seed crystal particles such that a crystalline orientation of the functional particles is aligned with the seed crystalline orientation.

5. The functional particle-dispersed thin film as claimed in claim 1, wherein said layer is selected from the group consisting of Si, Ge, GaAs, MgO, NaCl, KCl, $Al_2O_3$ and sapphire.

6. The functional particle-dispersed thin film as claimed in claim 1, wherein said seed crystal particles are composed of at least one element selected from the group consisting of Au, Ni, Ag, Si, Cu, Pd, Pt and Ge.

7. The functional particle-dispersed thin film as claimed in claim 1, wherein said functional particles are composed of at least one element selected from the group consisting of Fe, Co, Ni and rare earth elements.

8. A granular magnetic thin film comprising:
   a plurality of seed crystal particles having a seed crystalline orientation and dispersedly formed on a layer having a predetermined crystalline orientation and selected from one of the group consisting of a matrix and a primary coat, the seed crystal particles grown epitaxially such that the seed crystalline orientation is aligned with the predetermined crystalline orientation of the layer;

ferromagnetic particles formed around the seed crystal particles by epitaxial growth and surrounding each of the seed crystal particles; and a segregating layer formed around the ferromagnetic particles to segregate and cover the ferromagnetic particles.

9. The granular magnetic thin film as claimed in claim 8, wherein the seed crystal particles are composed of an element capable of epitaxial growth on the layer, the ferromagnetic particles are composed of an element capable of epitaxial growth on the seed crystal particles, and the ferromagnetic particles are grown epitaxially on the seed crystal particles such that a crystalline orientation of the ferromagnetic particles is aligned with the seed crystalline orientation.

10. The granular magnetic thin film as claimed in claim 8, wherein said ferromagnetic particles are formed larger in size than the seed crystal particles.

11. The granular magnetic thin film as claimed in claim 9, wherein said ferromagnetic particles are formed larger in size than the seed crystal particles.

12. The granular magnetic thin film as claimed in claim 8, wherein said ferromagnetic particles are not greater than 1,000 angstroms in size.

13. The granular magnetic thin film as claimed in claim 9 wherein said ferromagnetic particles are not greater than 1,000 angstroms in size.

14. The granular magnetic thin film as claimed in claim 8, wherein said layer is selected from the group consisting of Si, Ge, GaAs, MgO, NaCl, KCl, $Al_2O_3$, sapphire and quartz.

15. The granular magnetic thin film as claimed in claim 9, wherein said layer is selected from the group consisting of Si, Ge, GaAs, MgO, NaCl, KCl, $Al_2O_3$, sapphire and quartz.

16. The granular magnetic thin film as claimed in claim 8, wherein said seed crystal particles are composed of at least one element selected from the group consisting of Au, Ni, Ag, Si, Cu, Pd, Pt and Ge.

17. The granular magnetic thin film as claimed in claim 9, wherein said seed crystal particles are composed of at least one element selected from the group consisting of Au, Ni, Ag, Si, Cu, Pd, Pt and Ge.

18. The granular magnetic thin film as claimed in claim 8, wherein said ferromagnetic particles are composed of at least one element selected from the group consisting of Fe, Co, Ni and rare earth elements.

19. The granular magnetic thin film as claimed in claim 9, wherein said ferromagnetic particles are composed of at least one element selected from the group consisting of Fe, Co, Ni and rare earth elements.

20. The granular magnetic thin film as claimed in claim 8, wherein said segregating layer is composed of an amorphous non-conductive insulator.

21. The granular magnetic thin film as claimed in claim 8, wherein the particle size of each of the seed crystals is not greater than 200 angstroms.

22. The granular magnetic thin film as claimed in claim 8, wherein the interval between each of the ferromagnetic particles is not greater than 50 angstroms.

23. The granular magnetic thin film as claimed in claim 8, wherein the easy axis of each of the dispersed ferromagnetic particles is aligned in one direction.

24. A process of producing a functional particle-dispersed thin film comprising:

epitaxially growing atom particles as cores of seed crystal particles on a layer selected from the group consisting of a substrate and a primary coat, the layer having a layer crystalline orientation, the seed crystal particles being dispersed on the layer;

epitaxially growing constitutive atoms of functional particles onto surfaces of the seed crystal particles such that the functional particles surround each of the seed crystal particles; and forming a segregating layer to surround each of the functional particles.

25. A process of producing a granular magnetic thin film comprising:

epitaxially growing atom particles as cores of seed crystal particles on a layer selected from the group consisting of a substrate and a primary coat, the layer having a layer crystalline orientation, the seed crystal particles being dispersed on the layer;

epitaxially growing constitutive atoms of ferromagnetic particles onto surfaces of the seed crystal particles such that the ferromagnetic particles surround each of the seed crystal particles; and forming a segregating layer to surround each of the ferromagnetic particles.

26. The process of producing a granular magnetic thin film according to claim 25, wherein the interval between each of the seed crystal particles is controlled by regulating a temperature of the substrate in the formation of the seed crystal particles.

27. The process of producing a granular magnetic thin film according to claim 24, wherein said functional particles are epitaxially grown in a magnetic field to surround the seed crystal particles.

28. The process of producing a granular magnetic thin film according to claim 25, wherein said ferromagnetic particles are epitaxially-grown in a magnetic field to surround the seed crystal particles.

* * * * *

UNITED STATES PATENT AND TRADEMARK OFFICE
CERTIFICATE OF CORRECTION

PATENT NO. : 6,146,761
DATED : November 14, 2000
INVENTOR(S) : Hirotsu et al.

It is certified that error appears in the above-identified patent and that said Letters Patent is hereby corrected as shown below:

Title page,
Item [73], "Assignee:" insert -- Yoshihiko Hirotsu, Osaka-fu, Japan --.
Item [56], "References Cited," reference number "5,789,088, after "Nakai" insert -- et al.--;
Reference number "5,843,569" after "Kaitsu" insert -- et al. --.
Change reference number "5,878,798 Kobayashi" to -- 5,879,798 Kobayashi et al. --
Change reference number "5,988,674 Marinero" to -- 5,989,674 Marinero et al.--

Signed and Sealed this

Fifteenth Day of January, 2002

Attest:

Attesting Officer

JAMES E. ROGAN
*Director of the United States Patent and Trademark Office*